United States Patent [19]
Han

[11] Patent Number: 5,308,293
[45] Date of Patent: May 3, 1994

[54] VARIABLE SPEED DRIVE TRANSMISSION

[76] Inventor: Kyung S. Han, 1922 Coe's Post Run, Westlake, Ohio 44145

[21] Appl. No.: 963,439

[22] Filed: Oct. 19, 1992

Related U.S. Application Data

[63] Continuation-in-part of Ser. No. 807,192, Dec. 16, 1991, Pat. No. 5,169,359.

[51] Int. Cl.⁵ ............................................. F16H 37/12
[52] U.S. Cl. ....................................... 475/18; 475/16
[58] Field of Search ........................ 475/14, 15, 16, 18

[56] References Cited

U.S. PATENT DOCUMENTS

| | | | |
|---|---|---|---|
| 2,547,453 | 4/1951 | Egy | 74/679 |
| 3,079,812 | 3/1963 | Bross | 475/15 X |
| 4,077,278 | 3/1978 | Combastet | 74/682 |
| 4,090,413 | 5/1978 | Vickland | 475/15 X |
| 4,109,551 | 8/1978 | Remec | 475/9 |
| 4,700,589 | 10/1987 | Coronel | 475/18 X |
| 4,729,257 | 3/1988 | Nelson | 475/18 |
| 4,776,236 | 10/1988 | Gleasman et al. | 475/18 X |
| 4,802,376 | 2/1989 | Stidworthy | 475/15 X |
| 4,916,975 | 4/1990 | Combastet | 475/111 |
| 4,961,719 | 10/1990 | Wildermuth | 474/50 |
| 5,016,493 | 5/1991 | Han | 74/840 |
| 5,108,352 | 4/1992 | Pires | 475/16 X |
| 5,116,292 | 5/1992 | Han | 475/16 |
| 5,169,359 | 12/1992 | Han | 475/231 X |

FOREIGN PATENT DOCUMENTS

| | | | |
|---|---|---|---|
| 989644 | 5/1976 | Canada . | |
| 1323617 | 3/1963 | France . | |
| 2638801 | 5/1990 | France . | |
| 426136 | 3/1935 | United Kingdom | 475/14 |

Primary Examiner—Leslie A. Braun
Assistant Examiner—Ryan W. Massey
Attorney, Agent, or Firm—Harpman & Harpman

[57] ABSTRACT

A mechanical arrangement of multiple gears forming a transmission device for variable speed output and direction from a constant input source. The arrangement of multiple gears wherein the control of the output is determined by a selective incremental control input relative the constant input source. Combined arrangements of multiple gears utilize variable orbital paths control to determine variable output.

9 Claims, 4 Drawing Sheets

VARIABLE SPEED DRIVE TRANSMISSION

This, is a CIP of Ser. No. 07/807,192, allowed Jun. 22, 1992 now U.S. Pat. No. 5,169,359.

BACKGROUND OF THE INVENTION

1. Technical Field

This device relates to gear transmissions that selectively provide a variable output speed and direction from a constant speed power source.

2. Description of Prior Art

Prior art devices of this type have used a variety of different configurations to supply a constant output from a variable speed input source. Such examples are well known within the art and typically use electronics and/or manual sensing means to gage the varying ratios between the actual input and the desired constant output required or vice-a-versa.

Applicant's own prior U.S. Pat. Nos. 5,116,292 and 5,016,493 illustrate the orbital path change to determine variable output. Other mechanical methods of maintaining selected constant output from a variable input can be seen in U.S. Pat. Nos. 4,961,719, and 2,547,453.

Variable output from a constant source can be seen in U.S. Pat. Nos. 4,077,278, 4,109,551, 4,916,975 and foreign patents, Canadian 989644, French 2,638,801 and French 1,323,617.

In U.S. Pat. No. 4,961,719 a variable drive transmission is disclosed using a carrier member mounted on a rotatable crank shaft with a number of spaced pivotally mounted segments that can selectively engage a central sprocket with multiple chain engagement sprockets rotatably secured to each segment.

In U.S. Pat. No. 2,547,453 a variable speed transmission can be seen having a rotatable cage with multiple enclosed cranks. An annular cam is engaged by the cranks from which the selective output can be determined.

In U.S. Pat. No. 4,077,278 is directed towards dividing input rotational force into two rotational components. An output differential combines the divided components rotational force.

In U.S. Pat. No. 4,916,975 a torque converter is illustrated with two differential gears. In put is transferred through each differential gear by planetary shafts which are aligned co-axially to one another.

In the French patent 1,323,617 a gear arrangement having a pair of interconnected differential gear segments.

In Canadian patent 989644 a rotary mesh translating device is shown that uses two differentials with a self-locking rotary coupler.

French patent 2638 801 is directed towards two differential mechanical power converters wherein the cage of the first differential receives input from a motor, converts same to output via interengaged gears to input shaft of the second differential with output from the cage of the second differential determined therefrom.

SUMMARY OF THE INVENTION

A variable output and directional gear assembly with a incremental variable control input to provide a variable speed output and directional change from a constant input source.

DESCRIPTION OF THE PREFERRED EMBODIMENT

Figure 1:
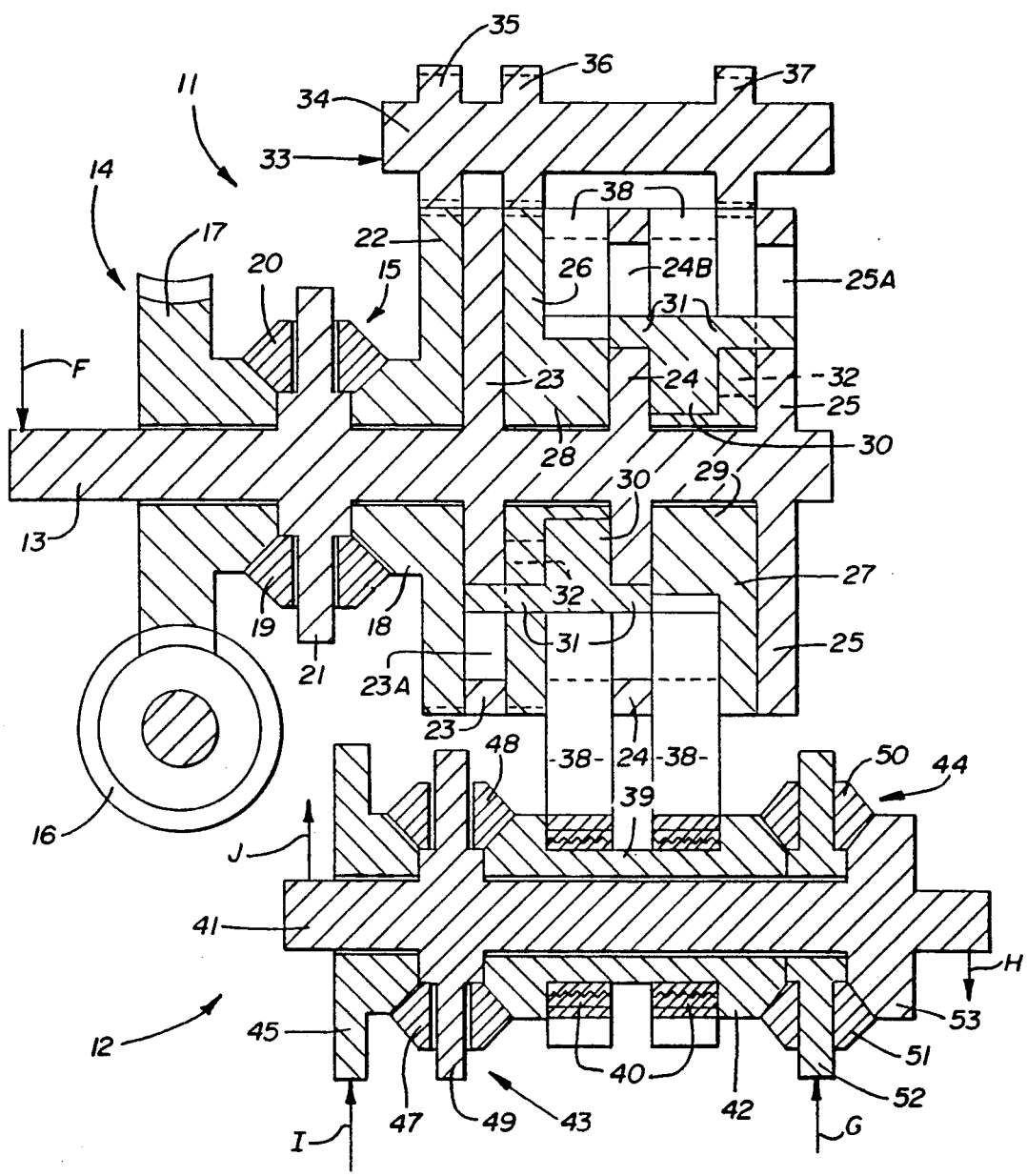
FIG. 1 is a cross-sectional graphic illustrative view of a gear assembly defining the interconnections of variable output to directional gearing assembly.
Figure 2:
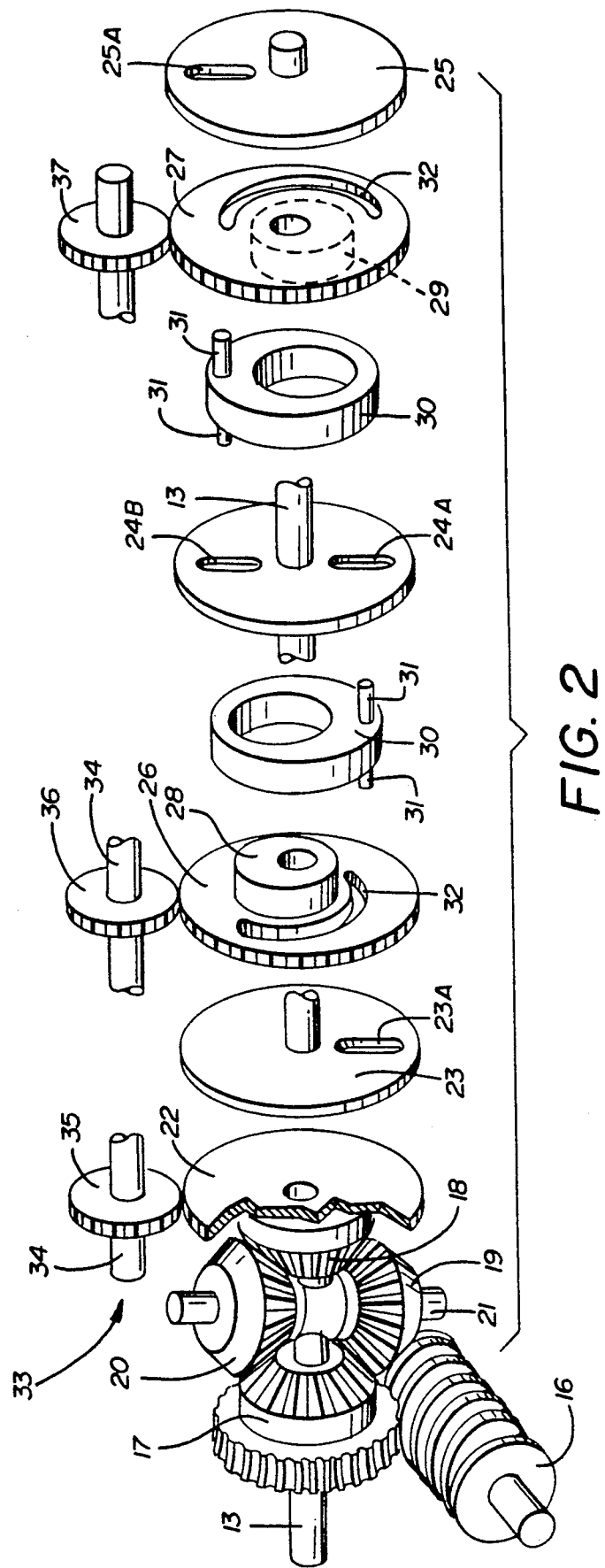
FIG. 2 is an exploded perspective view of the center input drive shaft and associated variable cam assemblies.

Referring to FIG. 1 of the drawings, a variable speed gear assembly can be seen having a speed selective gear configuration 11 and a directional gear assembly 12 interconnected therewith. The speed selective gear configuration 11 is comprised of an input and support shaft 13 on which is supported multiple pairs of interengaging gear pairs 14 and 15 and a control gear 16. Each of the gear pairs 14 and 15 is defined as having oppositely disposed matching gears 17 and 18 in gear pair 14 and interengaging gears 19 and 20 in gear pair 15. The control gear 16 incrementally advances said gear 17 by selectively incremental rotation within the gear pairs 14 and 15 and associated input support shaft 13. The control gear 16 determines the rotation of the gear 17 that will occur as the result of the pair of interengaging gear pairs 14 and 15 under input on input and support shaft 13 indicated by an input arrow F. In this example, the control gear 16 is of a worm gear configuration. The interengaging gears 19 and 20 of the gear pair 15 are rotatably mounted on a central support shaft 21 which is integral with said input and support shaft 13. It will be evident from the above description that each of the respective gears; 17,18,19, and 20 within each gear pair interengageably mesh with a respective gear of said adjacent gear pair in oppositely disposed relationship to one another. Since the support shaft 21 is driven directly by relative input to the drive and support shaft 13, it will rotate in a one to one relationship therewith. Repositioning the gear 17 will provide rotational output to the gear 18 and its output gear element 22 interengaged thereon. The input and support shaft 13 has three slotted control disks 23,24, and 25 extending therefrom in spaced horizontal relation to one another. The output gear element 22, hereinbefore described, is interconnected to an adjustable camming and variable drive assembly (A.C.D.), best seen in FIGS. 1 and 2 of the drawings. The (A.C.D.) is comprised of a pair of main camming disks 26 and 27 having respective cam parts 28 and 29 thereon in face to face relation. The camming disks 26 and 27 have a central bore therethrough and are rotatably positioned on said main input support shaft 13. The cam parts 28 and 29 are offset circular disks each having a circular cam 30 within an offset opening therein registerable with said respective cam parts 28 and 29. Control pins 31 extend from each of said cams 30 in oppositely disposed relation thereto. The control pins 31 are registerable in the respective slotted control disks 23,24 and 25 having control slots 23A,24A and B, and 25A therein. Respective spiral access slots 32 in cam disks 26 and 27, best seen in FIG. 2 of the drawings are aligned for access of respective control pins 31.

The gear 18 and its output gear element 22 are interconnected to the respective cam disks 26 and 27 by a gear assembly 33 having a support shaft 34 and multiple spaced engagement gears 35, 36, and 37 thereon.

Figure 4:
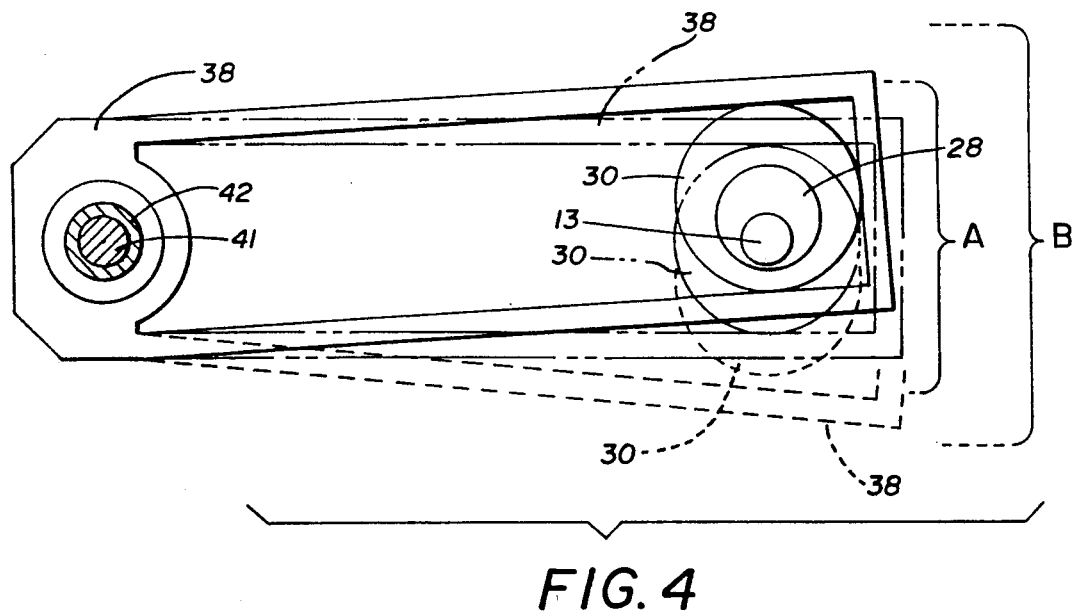
FIG. 4 is a side plan view illustrating the cam followers and effective variable output in relation to orbital path.

Referring to FIGS. 1 and 4 of the drawings, a pair of bifurcated cam engagement arms 38 can be seen slideably engaging respective cams 30. The cam engagement arms 38 are journaled at 39 with one-way clutch bearings 40 within as will be well known and understood by those skilled in the art. A dual output gear 42 rotatably positioned on an output drive shaft 41 is engaged by the respective one-way clutch bearings 40 as hereinbefore described. Pairs of interengaging gear assemblies 43 and 44 are supported on oppositely disposed respective ends of said output shaft 41. Said interengaging gear assembly 43 has a secondary gear 45 and oppositely disposed beveled matching gears 47 and 48 on a support shaft 49 extending and integral with said output drive shaft 41. The gear 45 acts as a directional control for the output of the output shaft 41. The gear assembly 44 has beveled gears 50 and 51 on a support and control shaft 52 rotatably positioned on the output drive shaft 41.

It will be seen that the interengaging gear assembly 44 opposite said gear assembly 43, that the output drive shaft 41 has a drive gear 53 that engages the beveled gears 50 and 51 hereinbefore described.

Accordingly, by selecting control input indicated by arrow G to the support and control shaft 52 will provide a directional output velocity of the output shaft 41 indicated by the arrow H in FIG. 1 of the drawings.

Control input indicated by arrow I on the secondary gear 45 of the gear assembly 43 will provide an opposite directional output of the drive shaft 41 as indicated by arrow J. It will thus be seen that the fixed directional rotational output from the variable speed assembly 10 via said cam engagement arms 38 to the dual output gear 42 can be changed depending o which of the hereinbefore described control gears i.e. 45 or 52 is activated while the remaining non-selected gear is passive, achieving selective directional output of the output shaft 41 as indicated by the respective output arrows J and H. The directional output is achieved when, for example, the rotation of the control gear 52 is passive and the input I is provided to the secondary control gear 45 allowing for the transfer of fixed directional rotational input from the dual output gear 42 to be transferred to the output shaft gear 53 integral with the output shaft 41 determining directional rotation of same as indicated by the output arrow H. By reversing the control input to the control gear 52 indicated by G on the output shaft 41 and allowing the secondary gear 45 to be passive, thus transferring directional output of the output shaft 41 is reversed as indicated at J.

The key to the directional reversal is the fact that the support shaft 49 of the gear assembly 43 is fixed to the output shaft 41 while the equivalent gear support of the gear assembly 44 (control gear 52) is freely rotational on the output shaft 41.

In operation, original input of rotational motion from the power source, not shown, illustrated by the arrow F drives the main input shaft 13 and is transferred to the cam disk 26 and 27 in a one to one ratio between the slotted disks 23,24, 25 with the registration pins 31 therein on the cam disks 26 and 27 described above via the spiral slots 32 respectively. This one to one ratio maintains the cams 30 relative fixed position to the cam disks 26 and 27. It will be evident from the above description that to change the cams 30 relative position i.e. orbital path about the axis of the main input shaft 13, an incremental rotation is inputed to the control gear 16 as required. By doing so, the engagement gears 36 and 37 slow momentarily along with the cam disks 26 and 27. The cams 30 associated therewith driven by the pins 31 continue thus repositioning themselves about the offset camming parts 28 and 29 effectively changing the true orbital path about the center axis of the main input shaft 13.

Figure 3:
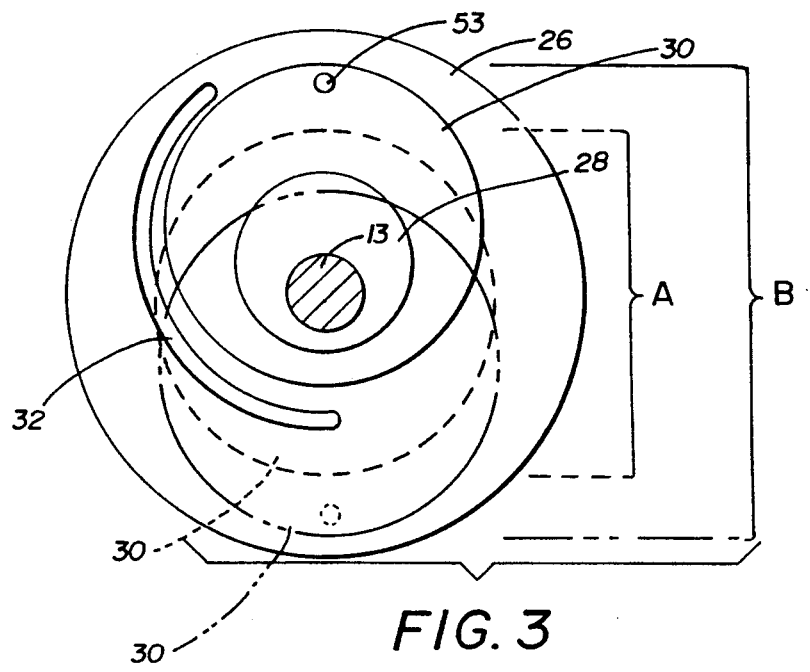
FIG. 3 is a graphic illustration of the variable orbital path determined by interconnected cam elements.

By referring to FIG. 3 of the drawings, the relative repositioning of the cams 30 upon the cam disks 26 and 27 is graphically illustrated. FIG. 3 shows in solid and broken lines the relative positions of the cam disks 26 and 27, cam parts 28 and 29 and cams 30 illustrated at the maximum orbital path of the respective cam 30 indicated by line B. Conversely, the cams 30 is also shown in dotted lines repositioned on the cam part 28 180° from its maximum orbital path on line B defining the minimal orbital path of the cams 30 illustrated by the line reference A.

In determining the effective orbital paths of the respective cams 30 it is clear that once the cams are repositioned about the cam parts 28 and 29 respectively, the cams are effectively locked and a new orbital relationship to both the cam parts 28 and 29 and the cam disks 26 and 27 as it rotates with the shaft 13 will be determined.

Referring to FIG. 4 of the drawings, the bifurcated cam engagement arms 38 are graphically illustrated engaging about the cams 30. With the relative orbital path increased, the resulting oscillation is transferred to the cam engagement arms 38 which either increases or decreases depending on the respective position of the cams 30 to the cam disks 26 and 27 (i.e. their orbital path A, and B). Since the cams 30 are always offset axially from one another, the rotational output of the arms (which is cyclable from each cam) is in effect constant to the respective dual output gears 42 as hereinbefore described.

Figure 5:
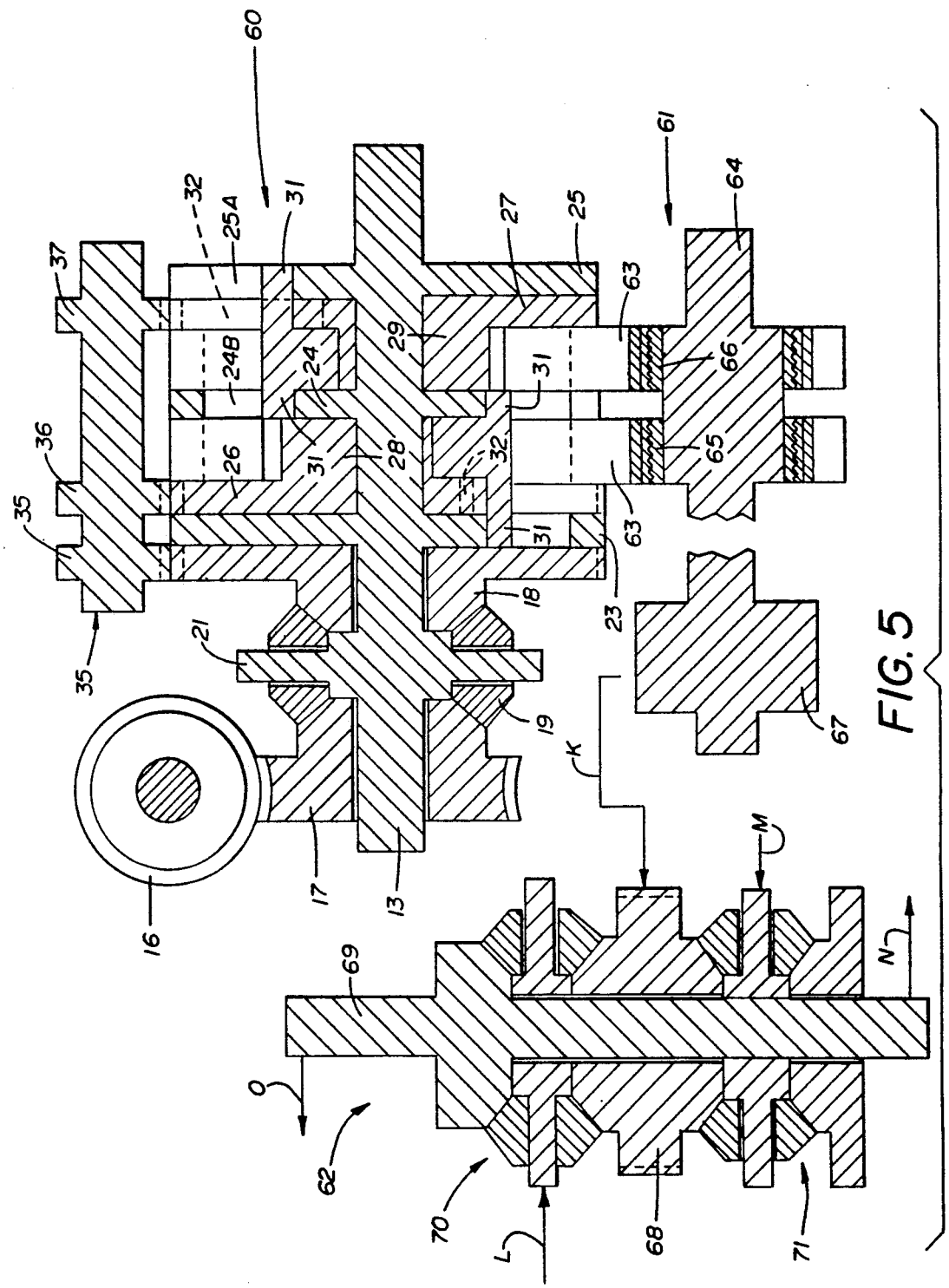
FIG. 5 is a cross-sectional graphic illustrative view of an alternate form of the gear assembly.

Referring now to FIG. 5 of the drawings, an alternate form of the invention can be seen wherein the basic arrangement of the speed selective gear configuration 11 is duplicated at 60 with a modification of the output and directional gear assembly 12 indicated by a secondary output assembly 61 and secondary directional gear assembly 62 respectively.

The secondary output assembly 61 has a pair of secondary bifurcated cam engagement arms 63 driving a secondary output shaft 64 via a pair of one-way clutch bearings 65 and 66. For illustration sake the remaining components of the speed selective gear configuration are numbered to correspond with that of FIG. 1 of the drawings.

A transfer worm gear 67 extends integrally from said secondary output shaft 64. The transfer worm gear 67 engages and drives an input gear 68 of said secondary directional gear assembly 62 as illustrated by an input arrow K therebetween. The secondary directional gear assembly 62 has a directional output shaft 69 that can be driven by either of two multiple gear assemblies 70 and 71. The secondary directional gear assembly 62 is identical to the directional gear assembly 12 seen in FIG. 1 of the drawings with the exception of the input gear 68 which in this alternate form takes the place of the dual output gear 42 illustrated in FIG. 1 of the drawings which is driven directly by the one-way clutch bearing 40.

Accordingly, the secondary directional gear assembly 62 has directional control input arrows L and M on respective multiple interengaging gear assemblies 70 and 71 which in effect directs the directional output of the output shaft 69 indicated by the directional output arrows associated therewith N and O.

Thus it will be seen that a variable drive transmission having incrementally adjusted speed control and output from a constant source with selective directional rotation output from two control elements has been illustrated and described in preferred and alternate forms. By combining the two independent cam assemblies via a single selective incremental control source (control gear 16), variable output can be achieved to the secondary directional gear assembly 62 via the worm gear 67 and input gear 68 to the output shaft 69.

It will be seen that a new and variable drive transmission having incrementally adjustable speed control output from a constant source has been illustrated and described and it will be apparent to those skilled in the art that various changes and modifications may be made therein without departing from the spirit of the invention, therefore

I claim:

1. A variable speed gear drive device having a constant input and a variable speed and directional output, comprises a first speed control gear assembly and a directional output gear assembly, said first speed control gear assembly comprising multiple geared pairs, an input drive shaft, and a control gear interengaging one of said geared pairs rotatably positioned on said input shaft, an adjustable camming and drive assembly interconnected by said input shaft by transfer gears, said control gear selectively and intermittently driving said geared pairs on said input shaft, said camming and drive assembly comprising offset circular disks on respective cam disks, offset cams rotatably positioned on said offset circular disk, control disks extending from said input drive shaft, means on said cams for registering with said control disks, a pair of cam engagement arms with one-way clutch drive gear selectively engaged thereon, said directional gear assembly comprising first and second multiple geared pairs on an output shaft, selective control input to said selective gear pairs and means for interconnecting said multiple gear pairs on said one-way clutch drive gears.

2. The variable speed gear drive device of claim 1 wherein said means for connecting said multiple gear pairs and the one-way clutch drive gears of the directional output assembly comprises, a dual output gear rotatably positioned on said output shaft, said first pair of multiple gear pairs having a support shaft extending from said output shaft, a secondary gear rotatably positioned on said output shaft engaging said first gear pair, said second gear pair having a support shaft rotatably about said output shaft.

3. The variable speed gear drive device of claim 1 wherein said means on said cams for registration with said control disks comprises oppositely disposed aligned control pins extending from said respective cams, registerable with said control disks.

4. The variable speed gear drive device of claim 1 wherein said control gear is of a worm gear configuration.

5. The variable speed gear drive device of claim 1 wherein said cam disks have separate spiral access slots extending from adjacent a center access bore outwardly therefrom.

6. A variable speed gear drive device having a constant input and a variable speed and directional output gear assembly comprising a first speed gear control assembly and a directional output gear assembly, said first speed control gear assembly comprising multiple geared pairs, an input drive shaft, a control gear interengaging one of said gear pairs rotatably positioned on said input shaft, an adjustable camming and drive assembly interconnected to said input shaft, said control gear intermittently driving said geared pairs on said input shaft, said camming and drive assembly comprising offset disks on respective cam disks, cams rotatably positioned on said offset disks multiple control disks on input and support shaft means on said cams for registration with said control disks, cam engagement arms selectively engaging said cams, a one-way bearing and output shaft interconnecting with said cam arms, said directional output gear assembly comprising first and second multiple gear pairs on an output shaft, selective control input to said geared pairs and means for interconnecting said geared pairs and said one-way clutch bearing assembly.

7. The variable speed gear device of claim 6 wherein said means for interconnecting said gear pairs and said one-way clutch bearing assembly comprises a transfer gear on said cam arm output shaft, and an input gear rotatably positioned on said directional gear assembly output shaft.

8. The variable speed gear device of claim 6 wherein said means on said cams for registering with said control disks comprises control pins extending from said respective cams registered with apertures in said controlled disks.

9. The variable speed gear device of claim 6 wherein said control gear is of a worm gear configuration.

* * * * *